United States Patent [19]

Ball, III et al.

[11] 4,137,364

[45] Jan. 30, 1979

[54] TRANSPARENT LAMINATE AND ADHESIVE FILM

[75] Inventors: George L. Ball, III, West Carrollton; Dennis W. Werkmeister, New Lebanon; Ival O. Salyer, Dayton, all of Ohio

[73] Assignee: Monsanto Research Corporation, St. Louis, Mo.

[21] Appl. No.: 739,367

[22] Filed: Nov. 5, 1976

[51] Int. Cl.$^2$ .................. B32B 27/36; B32B 17/10; C08F 8/00

[52] U.S. Cl. .................. 428/412; 204/159.14; 428/442; 428/429; 428/520; 526/9; 526/11; 526/331; 428/435

[58] Field of Search .................. 526/9, 11, 331; 428/430, 429, 442, 412, 520, 426, 435; 204/159.14; 156/272

[56] References Cited

U.S. PATENT DOCUMENTS

| | | | |
|---|---|---|---|
| 2,399,653 | 5/1946 | Roland | 526/9 |
| 2,448,946 | 9/1948 | Alderson | 526/9 |
| 3,378,515 | 4/1968 | Salyer | 526/9 |
| 3,382,215 | 5/1968 | Baum | 526/9 |
| 3,582,398 | 6/1971 | Ringler | 428/520 |
| 3,622,440 | 11/1971 | Snedeker | 428/412 |
| 3,631,161 | 12/1971 | Fan | 260/94.9 GA |
| 3,666,614 | 5/1972 | Snedeker | 526/9 |
| 3,923,757 | 12/1975 | Salyer | 526/9 |

FOREIGN PATENT DOCUMENTS 644690 7/1962 Canada .................. 204/159.14

Primary Examiner—Ellis Robinson
Attorney, Agent, or Firm—Bruce Stevens

[57] ABSTRACT

The invention relates to transparent or optically clear laminates and adhesive films used to make these laminates having a temperature utility range far greater than those previously developed and which are especially useful for windshields of high speed aircraft which need such a broad temperature range. These transparent adhesive films have a temperature utility in the range of −65° F to at least 350° F in laminates and comprise an ethylene/vinyl acetate copolymer having a vinyl acetate content in the range of 40% to 60%, the copolymer being partially hydrolyzed to form a terpolymer having a hydroxyl content in the range of 1% to 6%, the terpolymer in film form and/or laminate being heat treated and cross-linked to give the adhesive film. The laminates are made from transparent layers of glass and/or plastic bound together with the transparent adhesive film.

12 Claims, 2 Drawing Figures

TRANSPARENT LAMINATE AND ADHESIVE FILM

BACKGROUND OF THE INVENTION

The invention herein described was made in the course of or under a contract or subcontract thereunder, with the United States Department of the Air Force.

1. Field of the Invention

The present invention is related to the field of adhesives or interlayers for safety laminates used as windows and windshields in vehicular, aircraft, armor, architectual and related applications. More particularly, it is related to adhesives for laminates of glass and/or plastic made from a cross-linked terpolymer of ethylene/vinyl acetate/vinyl alcohol.

2. Description of the Prior Art

Previously ethylene/vinyl acetate/vinyl alcohol terpolymer adhesives useful with glass, polycarbonate and other transparent plastics, were shown to be useful as an aircraft glazing interlayer from −65° F. to 165° F. The new transparent adhesive films of this invention have a greatly extended temperature utility range as an aircraft glazing interlayer of −65° F. to at least 350° F. The improved mechanical performance to 350° F. introduced no changes in the basic (550° F.) thermal stability or transparency of the ethylene terpolymer. A closely related prior art patent is U.S. Pat. No. 3,923,757 which provides transparent peroxide cross-linked ethylene/vinyl acetate/vinyl alcohol adhesive interlayers for making glass and polycarbonate laminates useful from −65° F. to 165° F., but not useful at temperatures appreciably above 165° F.

There is much prior art in the general area ethylene/vinyl acetate/vinyl alcohol terpolymers including crosslinking of such polymers, e.g. U.S. Pat. No. 2,399,653 teaches partially hydrolyzed ethylene/vinyl acetate copolymers and they can be used as safety glass interlayers. This patent also teaches that they may be insolubilized or cured by means of crosslinking agents.

U.S. Pat. No. 2,448,946 teaches partially hydrolyzed ethylene/vinyl acetate copolymers and the crosslinking of these polymers with peroxides. These compositions are stated to be useful for a number of purposes including safety glass interlayers.

U.S. Pat. No. 3,378,515 teaches partially hydrolyzed copolymers of ethylene and vinyl acetate crosslinked with aromatic diisocyanates. These resins are stated to be particularly useful as ring seals in hydraulic systems because of solvent resistance and it is also stated that they can be used as adhesives for glass of cellulosic laminates.

U.S. Pat. No. 3,382,215 teaches a broad range of what are stated to be virgin olefin polymers modified with organic polyisocyanates. Among the examples are partially and completely hydrolyzed ethylene/vinyl acetate copolymers crosslinked with isocyanates. Among the uses for these polymers is as laminate interlayers for a wide variety of materials including polymeric, cellulosic and glass surfaces.

U.S. Pat. No. 3,622,440 teaches laminates especially useful for automobile windows and windshields prepared from glass and polycarbonate resin sheets using ethylene/vinyl acetate copolymer interlayers. A third comonomer can be included and among the many other third comonomers mentioned is vinyl alcohol. An organosilicon compound is specified as an adhesion promoting agent and a source of free-radicals for crosslinking. The organosilicon compound can be a silyl peroxide in which case both the silicon and source of free-radicals is provided by the silicon compound. Crosslinking can also be provided by irradiation.

U.S. Pat. No. 3,631,161 teaches crosslinking ethylene-containing polymers with a silyl peroxide and among the many ethylene-containing polymers named is partially hydrolyzed ethylene/vinyl acetate copolymer.

U.S. Pat. No. 3,666,614 teachings are much the same as U.S. Pat. No. 3,622,440 which was filed the same day with the same inventors.

SUMMARY

The invention relates to transparent or optically clear laminates and adhesive films used to make these laminates having a temperature utility range far greater than those previously developed and which are especially useful for windshields of high speed aircraft which need such a broad temperature range. These transparent adhesive films have a temperature utility in the range of −65° F. to at least 350° F. in laminates and comprise an ethylene/vinyl acetate copolymer having a vinyl acetate content in the range of 40% to 60%, the copolymer being partially hydrolyzed to form a terpolymer having a hydroxyl content in the range of 1% to 6%, the terpolymer in film and/or laminate form being heat treated and cross-linked to give the adhesive film. The laminates are made from transparent layers of glass and/or plastic bound together with the transparent adhesive film.

Preferred ethylene/vinyl acetate copolymers have vinyl acetate content in the range of 45% to 55% and the preferred hydroxyl content in the terpolymer is in the range of 2% to 4%.

Aircraft windshield temperatures of up to 350° F. are anticipated for high performance military aircraft. These windshields must resist bird impacts, which makes it desirable to use bonded plies of glass and polycarbonate (or other plastics). Effective utilization of these materials requires a transparent interlayer, compatible with both glass and polycarbonate, that will be elastomeric over a wide temperature range to accommodate a variety of thermal expansion conditions. It is also desirable, from a windshield fabricator's point of view, that the material be capable of being processed by thermoplastic (sheet) laminating techniques. The interlayers and laminates of this invention have all these desired qualities.

The making of copolymers of ethylene and vinyl acetate are well known in the art and such copolymers are available commercially. Kirk-Othmer's "Encyclopedia of Chemical Technology", Second Edition, Vol. 21, page 33, describes the making of such copolymers as follows: The ethylene/vinyl acetate copolymer (EVA) processes must of necessity be operated under high pressure (M. K. Lindemann, Paint Manuf. 38 (9), 30-36 (1968)). The low vinyl acetate EVA copolymers, containing 10–40% vinyl acetate, are made in processes similar to those used to make low-density polyethylene where pressures are usually 15,000 psi and higher. A medium, i.e. 45%, vinyl acetate copolymer with rubber-like properties is made by solution polymerization in t-butyl alcohol at 5000 psi. The 70–95% vinyl acetate emulsion copolymers are made in emulsion processes under ethylene pressures of 300 to 750 psi.

Hydrolyzed copolymers of ethylene and a vinyl alkanoate, such as hydrolyzed ethylene/vinyl acetate copolymer, are well-known; see, e.g. U.S. Pat. Nos. 2,386,347; 2,399,653; 2,403,464–5; 2,434,179; 2,448,946; 2,451,963; 2,467,196; 3,114,736 and 3,386,978. They are generally prepared by treating an ethylene/vinyl alkanoate copolymer with an acidic or alkaline hydrolyzing agent. Depending on the hydrolysis conditions some or all of the ester groups are converted to hydroxyl radicals. Complete hydrolysis results in a copolymer consisting of ethylene and vinyl alcohol units. When the hydrolysis is incomplete, the hydrolyzed copolymer consists also of vinyl ester units together with the ethylene and vinyl alcohol units. U.S. Pat. No. 3,386,978 is an especially suitable process for making hydrolyzed ethylene/vinyl acetate copolymer suitable for use in making the adhesive films or interlayers and laminates of the present invention.

The particular ethylene terpolymer system, an ethylene/vinyl acetate/vinyl alcohol terpolymer, used experimentally to establish the utility of this invention was made from an ethylene/vinyl acetate copolymer having about 50% vinyl acetate (available in pellet form commercially) which was hydrolyzed to contain 3.2% hydroxyl. The copolymer before hydrolysis analyzed 50±2% vinyl acetate (by saponification) and a melt index at 125° C. of 1.6±1.2 g/10 mm based on sampling of a number of bags of the material, although the melt index as ordered from the manufacturer was 1.0±0.5 g/10 mm. Unless differently stated, percentages are by weight throughout the specification and claims of this application.

The interlayer of the invention has adequate strength to 350° F. while retaining excellent high elongation down to −65° F. The high temperature performance was achieved while retaining laminate formability at 250° F. required for polycarbonate. The improved mechanical performance to 350° F. introduced no changes in the basic (550° F.) thermal stability or transparency of the ethylene terpolymer. The most significant improvement in thermal-mechanical properties occurred between +165° F. and 350° F., where no measurable performance had existed before.

The improved mechanical performance to 350° F. was achieved through a controlled limited crosslinking of the basic ethylene terpolymer. It was shown that improved form stability could be provided by both chemical and radiation crosslinking. The crosslinking can be conducted during or after formation of the ethylene terpolymer interlayer sheet. The crosslinking is taken to completion in terms of the amount of crosslinking reagent added; therefore, the interlayer is stable with time.

In addition to the significant high temperature improvement in mechanical performance, ultimate elongations of up to 200% were retained at −65° F. Tensile and tear strengths were increased slightly between −65° F. and 165° F., while both tensile impact and tensile elongation were decreased slightly between −65° F. and room temperature.

Bonded laminates of glass/polycarbonate made from the ethylene terpolymer interlayer of the invention survived repeated thermal cycling between −65° F. and 300° F. Failures occurred only in the polycarbonate, while softened and bent, as expected, at the higher temperature. Glass/glass laminates containing the terpolymer survived thermal cycling and also thermal soaking at 350° F.

The two chemical crosslinking agents used were isophthaloyl biscaprolactam and vinyltriethoxy silane, and 0.3% of the caprolactam or 1% of the silane were determined to be adequate for the desired degree of crosslinking; however, both higher and lower amounts of these crosslinking agents can be used to produce the interlayers and laminates of the invention. These crosslinking agents are incorporated into the terpolymer in a Banbury mixer, on a mill roll, or other low (cold blending) temperature compounding equipment. The compounded terpolymer containing the crosslinking agent is then molded, calendered or extruded into a film at about 200° F. and crosslinking is completed by heating for at least one hour at 350° F. The partially crosslinked sheet is then laminated between sheets of glass, glass/polycarbonate, polycarbonate, glass/acrylic, acrylic/polycarbonate, acrylic or other transparent plastics at temperatures of 250° F. By this process, there is obtained a laminate in which the interlayer material has significant strength and form stability up to a temperature of at least 350° F. or higher.

In the electron bombardment crosslinking process, the ethylene terpolymer is first formed into film or interlayer of desired thickness. The sheets are then irradiated by electron bombardment at dosages in the range of 10 to 45 megarads at voltages of 180 to 300 kilovolts. Near optimum conditions for achieving the desired level of crosslinking involve a total dosage of about 45 megarads at 180 kilovolts. However, equivalent results can probably be obtained with a dosage of only 10 megarads at 300 kilovolts. The irradiated film, crosslinked as described above, is then placed between the desired glass and/or plastic layers, and laminated by conventional methods such as that described hereinabove at a temperature of about 250° F. to obtain a laminate of similar properties to the laminate described in the previous paragraph using a chemical crosslinking agent. These transparent adhesive films have a temperature utility in the range of −65° F. to at least 350° F. in laminates.

In order to achieve significantly higher level of crosslinking, such that the interlayer material retains much higher strength and is useful to even higher temperatures than the lightly crosslinked material, up to temperatures of about 450° F. or higher, a different process and treatment is used. The chemical crosslinking agents, e.g. the isophthaloyl biscaprolactam or vinyl triethoxy silane, are used in concentrations of two to five times higher concentrations than used in the lightly crosslinked product, and the crosslinking agents are incorporated into the terpolymer by melt compounding as in a Banbury mixer or a mill roll at about 225° F. temperatures. The terpolymer containing the crosslinking agent is then processed into an interlayer or film of the desired thickness by calendering or extrusion at about 225° F. which does not activate the crosslinking agent. The interlayer which is still thermoplastic is then placed between two sheets of glass, glass and a heat-resistant plastic or two sheets of heat resistant plastic, and is laminated at temperatures up to 350° F. Examples of transparent high heat distortion polymers include crosslinked acrylics, polysulfones and diallyl phthalate. This high temperature laminating will insure thorough crosslinking of the interlayer simultaneously with adhesion to the two substrate materials. By this means, there are obtained laminates which have superior strength and stability at temperatures up to 400° F. for significant periods of time, and up to 450° F. or higher for shorter time periods.

Procedure for making the laminates is well known in the art, and autoclaves or heated hydraulic presses can be used. For example, laminates of glass-to-glass, glass-to-polycarbonate, polycarbonate-to-polycarbonate can be made using the terpolymer of this invention in film or interlayer form, cleaning the layers glass and/or plastic to be laminated, cutting the terpolymer interlayer to fit the laminate, cleaning the interlayer, placing the interlayer between the layers that are to be bonded, and heating the unbonded laminate (preferably with the interlayer under vacuum to eliminate bubbles) with mechanical pressure on the laminate to ensure bonding. Laminating pressure of 5 to 30 psi and a laminating temperature of about 70° F. to 300° F. usually produces a satisfactory laminate depending upon the adhesive interlayer. To provide further crosslinking during laminating the higher temperature is desirable to reduce cure time. If glass layers and/or heat-resistant plastics rather than polycarbonate are being laminated, laminating temperatures up to 350° F. or perhaps 400° F. can be used.

The polycarbonate may be any suitable layers of polycarbonate such as that disclosed in U.S. Pat. Nos. 3,028,365 and 3,117,019 and is preferably prepared by reacting di-(monohydroxyaryl)-alkanes with derivatives of carbonic acid such as phosgene and bischlorocarbonic acid esters of di-(monohydroxyaryl)-alkanes. An excellent description of the polycarbonates of this invention can be found in U.S. Pat. No. 3,539,442 beginning at column 4, line 34 and ending at column 6, line 19, and that description is herewith incorporated by reference.

The glass employed in this invention can be an amorphous, brittle, transparent material comprising a fused mixture of the silicates of the alkali and alkaline earth or heavy metals. It can be regular plate glass, polished plate glass, or float glass, etc. of varying thicknesses. In addition, this invention contemplates using fully or semiheat tempered or chemically tempered glass of varying thickness. The glass may be colored or decorated.

The transparent heat-resistant plastics disclosed hereinabove for use rather than polycarbonates are either commercially available and/or methods of making them well known in the art.

DESCRIPTION OF THE PREFERRED EMBODIMENTS

The invention is further illustrated by, but not limited to the following examples.

The physical characteristics of a typical interlayer of the invention are summarized in Table 1 as follows:

TABLE 1

| Property | ASTM METHOD | Value |
|---|---|---|
| Temperature at Modulus of | D1043 | |
| 45,000 psi, ° F | — | −27 |
| 675 pis, ° F | — | +17 |
| Stifflex Range, ° F | −1 | 44 |
| Resistance to heat, ° F | −2 | 450 |
| Zero Tensile Strength, ° F | D1637[3] | 380 |
| Zero Tensile Elongation, % | −3 | 2000 |

TABLE 1-continued

| Property | ASTM METHOD | Value |
|---|---|---|
| Laminate Utility Temperature Range | | |
| Glass-Glass, ° F | −4 | −65 to +350 |
| Glass-Polycarbonate, ° F | — | −65 to +270 |
| Polycarbonate-Polycarbonate, ° F | — | −65 to +270 |
| Tensile (Room Temperature) | D412[5] | |
| Strength, psi | — | 4300 |
| Elongation, % | | 1400 |
| Impact (Tensile) Strength, ft lb/in.[2] | D1822[6] | 580 |
| Tear Strength, lb/in. thickness | D1004[7] | 350 |
| Shear Strength, psi | D1002[8] | 300 |
| Transmission (laminate), % | D1003[9] | >85 |
| Haze (laminate), % | D1003[9] | <3.6 |
| Laminating Conditions[10] | | |
| Temperature, ° F | — | 250 |
| Pressure, psi | — | 45 |

[1]Stifflex Range is difference between temperatures at two modulis.
[2]Zero weight loss in an inert atmosphere.
[3]Indicates temperature and elongation at break with ~3 psi load upon heating at a rate of 10° C/min.
[4]Based on thermal cyclic exposure of 5 in. × 5 in. glass-glass and glass-PC laminates with 0.03 in. adhesive layer. Plies 0.25 in. thick.
[5]Specimen C, 0.03 in. thick, 2 imp crosshead.
[6]Specimen - Type 412 C; 24 in. drop height.
[7]Thickness 0.03 in.
[8]Aluminum tabs.
[9]Determined on Wright-Patterson AFB Spectrophotometer, 0.03 in. thick thick adhesive layer between plies of 0.125 in. thick glass. Reference air.
[10]Typical maximums required.

Figure 1:
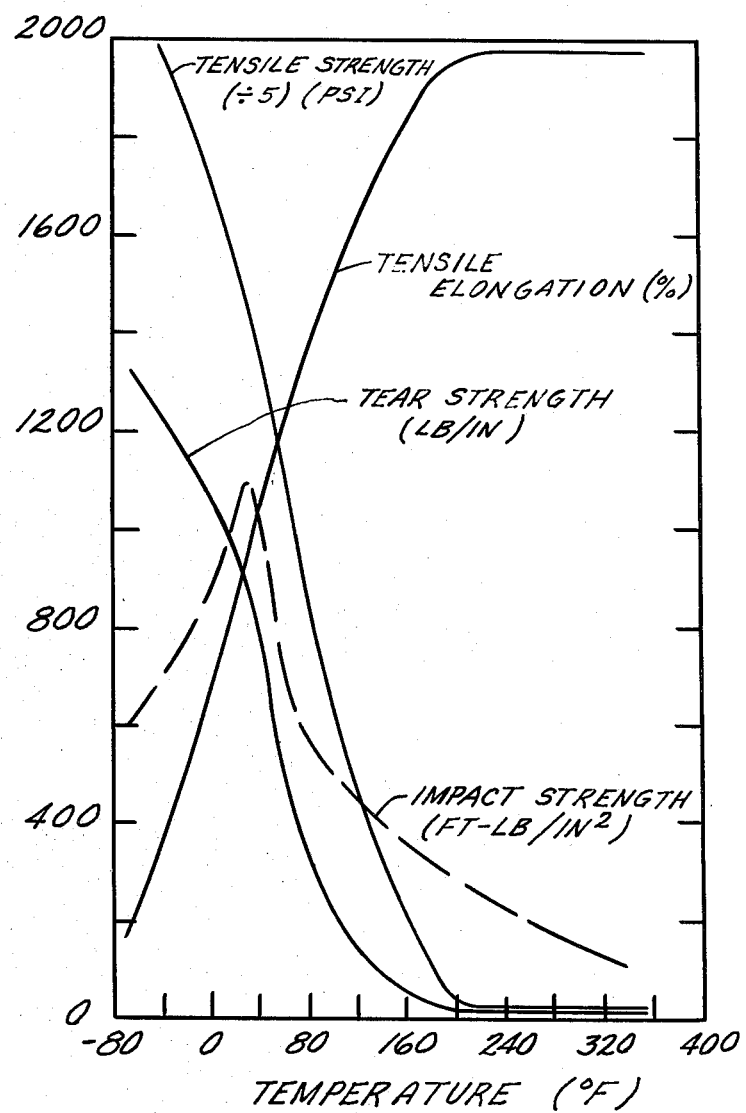
Figure 2:
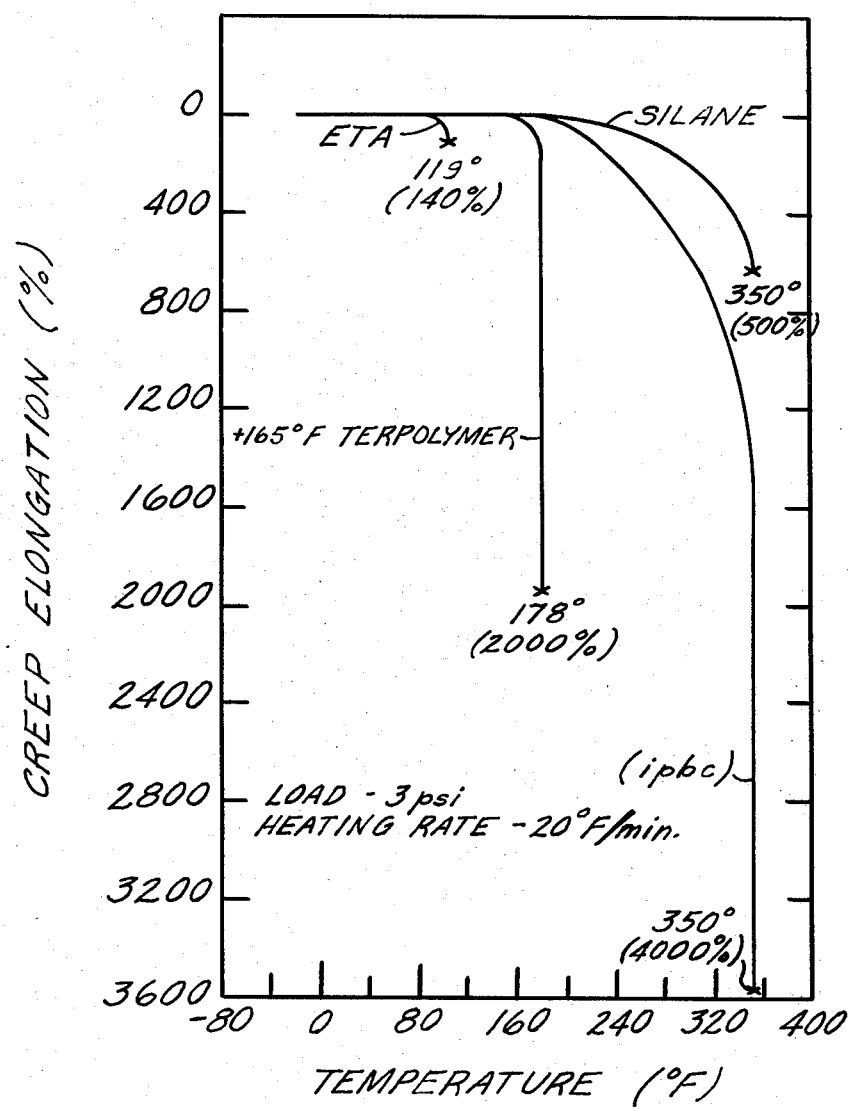

FIG. 1 summarizes the mechanical properties of this interlayer of the invention versus temperature, and FIG. 2 gives creep elongation versus temperature for vinyltriethoxy silane and for isophthaloyl biscaprolactam (ipbc) crosslinked interlayers of the invention compared with a typical crosslinked terpolymer interlayer previously available useful to +165° F. and a terpolymer interlayer (ETA) which has not been crosslinked.

The physical performance of the high temperature ethylene terpolymer adhesive interlayer of the invention (average of data on interlayers cured both with silane and ipbc) is best illustrated by tensile strength, tensile elongation, tensile impact, and tear strength data. These physical characteristics as a function of temperature from −65° F. up to +350° F. are summarized graphically in Tables 2 through 5 where comparison is made to the earlier developed adhesive that had been determined to be usable to 165° F.

The mechanical characteristics of the adhesive interlayer of invention illustrated in Tables 6 through 9 merit discussion, especially compared with the characteristics of the 165° F. interlayer. Any differences between these two reflect improvements or degradation in properties attributable to the limited controlled crosslinking. During the development of a higher temperature material, degrading effects were to be minimized. Beneficial effects, other than improvement in the mechanical properties above 165° F. were considered an added bonus.

In all cases (tensile, impact and tear) increases in mechanical performance above 165° F. were achieved. The magnitude of these properties, while low, were deemed adequate for an aircraft windshield interlayer application. This is because the primary function of the interlayer is to bond the actual load-bearing materials, glass and polycarbonate (or other plastic) together and transmit loads to them.

TABLE 2

TENSILE STRENGTH[1] OF ETHYLENE TERPOLYMERS AS A FUNCTION OF TEMPERATURE

| | Strength, psi | | | | | | |
|---|---|---|---|---|---|---|---|
| Temperature, ° F | −65 | −40 | +32 | +74 | +165 | +200 | +350 |
| 165° F interlayer | 8,200 | 8,800 | 6,000 | 3,600 | 20 | 0 | 0 |
| Interlayer of | | | | | | | |

TABLE 2-continued
TENSILE STRENGTH[1] OF ETHYLENE TERPOLYMERS AS A FUNCTION OF TEMPERATURE

| Temperature, °F | \-65 | \-40 | +32 | +74 | +165 | +200 | +350 |
|---|---|---|---|---|---|---|---|
| | | | | Strength, psi | | | |
| invention[2] | 10,500 | 10,000 | 7,000 | 4,300 | —[3] | 24 | 2 |

[1] ASTM D412, Specimen C, 2 in./min crosshead, ~0.03 in. thick.
[2] Micro tensile specimens used due to high elongation.
[3] Indicates data not obtained or available in literature.

TABLE 3
Tensile Elongation[1] Of Ethylene Terpolymers As A Function Of Temperature

| Temp., °F | \-65 | \-40 | +32 | +74 | +165 | +200 | +350 |
|---|---|---|---|---|---|---|---|
| | | | | Elongation, % | | | |
| 165° F interlayer | 460 | 570 | 1,400 | 1,200 | 60 | 0 | 0 |
| Interlayer of invention[2] | 220 | 360 | 900 | 1,400 | —[3] | >2,000 | >2,000 |

[1] ASTM D412, Specimen C, 2 in./min crosshead, ~0.03 in. thick.
[2] Micro tensile specimens used due to high elongation.
[3] Indicates data not obtained or available in literature.

TABLE 4
Tensile Impact Strength[1] Of Ethylene Terpolymers As A Function Of Temperature

| Temp., °F | \-65 | \-40 | +32 | +74 | +165 | +200 | +350 |
|---|---|---|---|---|---|---|---|
| | | | | Impact Strength, ft lb/in.[2] | | | |
| 165° F Interlayer | 360 | 890 | 1,100 | 1,100 | 135 | 0 | 0 |
| Interlayer of invention | 600 | 670 | 1,100 | 580 | —[2] | 300 | 120 |

[1] ASTM D1822, Specimen Type
[2] Indicates data not obtained or available in literature.

TABLE 5
Tear Strength[1] Of Ethylene Terpolymers As A Function Of Temperature

| Temp., °F | \-65 | \-40 | +32 | +74 | +165 | +200 | +350 |
|---|---|---|---|---|---|---|---|
| | | | | Tear Strength, lb/in. | | | |
| 165° F Interlayer | 1,100 | 1,000 | 410 | 180 | 5 | 0 | 0 |
| Interlayer of invention | 1,300 | 1,150 | 780 | 350 | —[2] | 10 | 3 |

[1] ASTM D1004, Specimen ~0.03 in. thick.
[2] Indicates data not obtained or available in literature.

The physical integrity and functioning of the adhesive interlayer of the invention was further illustrated through the thermal cycling of glass/polycarbonate, glass/glass, and polycarbonate/acrylic laminates containing the adhesive interlayer. 5 inch × 5 inch three ply laminates were prepared using ¼-inch plies of glass, polycarbonate, or acrylic and 0.030 inch of interlayers. These laminates were repeatedly thermal cycled (100) between −65° and +165° F. with occasional (4) excursions to 350° F. (for glass/glass), or 300° F. (for laminates containing polycarbonate).

Repeated thermal cycling of the bonded laminates described above resulted in no visible failures of any sort to the ethylene terpolymer adhesive, or to its bond with any of the laminate plies. The only degradation occurred with the polycarbonate due to the softening and deforming during excursions to 300° F., which is above its 277° F. glass transition temperature.

Thermal shock and soak tests: A sample of the interpolymer adhesive of the invention was compounded with 0.29 phr of ipbc. The sample (30 mil thick) was cured into a sheet for 2 hours in the press at 320° F. The ZTS* temperature was 400° F. This sheet was vacuum dried overnight at 158° F. and then laminated between glass. A few small bubbles were noted near the edges. The sample was then aged for 24 hours at 350° F., whereupon all bubbles disappeared.

*Zero Tensile Strength Temperature (ZTS) - A useful screening test (modified ASTMD 1637) is the zero tensile strength temperature determination. The test as used only required a forced air oven capable of reaching 410° F. and simple grips. A simple support is placed in the oven and a sample 15 mils thick by ⅛ inch long by ¼ inch wide is suspended from the support using clips (3 psi load). The oven door is closed and the temperature increased until the sound of the lower sample clip hitting the oven bottom is heard; at this point the oven temperature is recorded as the ZTS temperature. The ZTS determination is rapid (less than 30 min) and quite reproducible (±5° F.). The test quickly determines if crosslinking or other treatments have had any effect on the thermal form properties of the material by indicating creep elongation and fracture at elevated temperatures.

The above laminate was held in a verticle position and attached to a support by only one pane of glass. The sample was then abruptly immersed into an oven at 400° F. and held for 24 hours. The glass plate, which was free to move, did not. The laminate was then placed in the low temperature environmental chamber and cycled eight times per 24 hour period between −60° F. to 160° F. (160 to −60 in 1.5 hour, −60 to 160 in 0.5 hour, soak at 160 for 1 hour). The laminate survived all tests perfectly and the original bubbles never did reappear.

A second cured sample containing 0.32 phr ipbc was subjected first to a 24 hour 350° F. exposure and then thermocycled from −60° to +160° F. The interlayer had a ZTS temperature of 360° F. A bubble-free laminate was obtained. This laminate was subjected to 24 hours at 350° F. and then 30 days of thermocycling from −60° to +160°. The laminate remained bubble-free with no movement of the glass.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art of the disclosure. Accordingly, modifications are contemplated which can be made without departing from the spirit of the described invention.

What is claimed is:

1. An optically clear adhesive film useful in laminates comprising an ethylene/vinyl acetate/vinyl alcohol terpolymer having a hydroxyl content in the range of 1% to 6%, said terpolymer having been formed by partial hydrolysis of an ethylene/vinyl acetate copolymer having a vinyl acetate content in the range of 40% to 60%, and said terpolymer in film form having been heat treated and crosslinked by means of radiation or curing in the presence of an effective amount of a crosslinking agent selected from the group consisting of vinyl triethoxy silane and isophthaloyl biscaprolactam to give said adhesive film having a temperature utility in laminates in the range of −65° F. to at least 350° F.

2. An adhesive film of claim 1 wherein said ethylene/vinyl acetate copolymer has a vinyl acetate content in the range of 45% to 55% and said terpolymer has a hydroxyl content in the range of 2% to 4%.

3. An adhesive of claim 1 wherein said ethylene/vinyl acetate copolymer has a vinyl acetate content of about 50% and said terpolymer has a hydroxyl content of about 3%.

4. An adhesive of claim 1 wherein vinyl triethoxy silane was used as a crosslinking agent.

5. An adhesive of claim 1 wherein isophthaloyl biscaprolactam was used as a crosslinking agent.

6. An adhesive of claim 1 wherein said adhesive film was crosslinked by means of electron bombardment.

7. An adhesive of claim 1 wherein the heat treating was in the range of about 200° F. to about 400° F.

8. An optically clear laminate which comprises optically clear layers of glass and/or plastic bound together with an optically clear adhesive film of claim 1.

9. A laminate of claim 8 wherein said layers are glass.

10. A laminate of claim 8 wherein said layers are polycarbonate.

11. A laminate of claim 8 wherein said layers are glass and polycarbonate.

12. A laminate of claim 8 wherein said layers are polycarbonate and acrylic.

* * * * *